Jan. 19, 1954    R. B. HOLT    2,666,635
BALANCE INDICATOR
Filed Oct. 18, 1948    2 Sheets-Sheet 1

RAYMOND B. HOLT,
INVENTOR.

BY Lyon & Lyon
ATTORNEYS

RAYMOND B. HOLT,
INVENTOR.

BY Lyon & Lyon
ATTORNEYS

Patented Jan. 19, 1954

2,666,635

UNITED STATES PATENT OFFICE 2,666,635

BALANCE INDICATOR

Raymond B. Holt, Alhambra, Calif.

Application October 18, 1948, Serial No. 55,029

7 Claims. (Cl. 265—58)

The present invention relates to an improved balance or "over-under" indicator arranged for conventional mounting on a beam-type weighing scale to provide a visual magnified indication of the balanced condition of the scale.

An object of the present invention is to provide an improved indicator characterized by its simplicity and ruggedness.

Another object of the present invention is to provide an improved balance indicator which incorporates novel motion damping means.

Still another object of the present invention is to provide an improved balance indicator of the type described characterized by the fact that the scale associated with the many pointer elements is uniform, i. e., the displacements of the pointer are lineally proportional to the degree of unbalance.

Yet another object of the present invention is to provide an improved balance indicator incorporating a novel transmitting mechanism characterized by the fact that shock loads applied to the scale platform are not transmitted in whole to the dial pointer.

Still a further object of the present invention is to provide an improved balance indicator incorporating novel adjusting means for adjusting the sensitivity and calibration thereof.

Yet a further object of the present invention is to provide an improved balance indicator which incorporates a novel motion damping mechanism and a motion transfer mechanism arranged to minimize greatly the effect of shock forces applied to the scale platform on the motion of the dial pointer.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
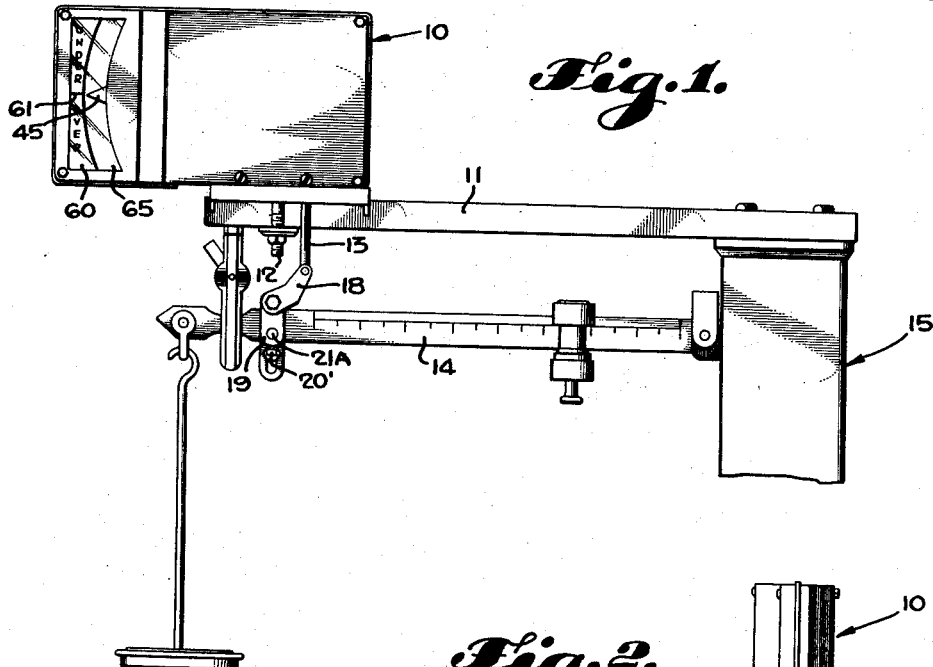
Figure 1 shows a balance indicator embodying the present invention mounted on a beam-type weighing scale.
Figure 5:
Figure 5:
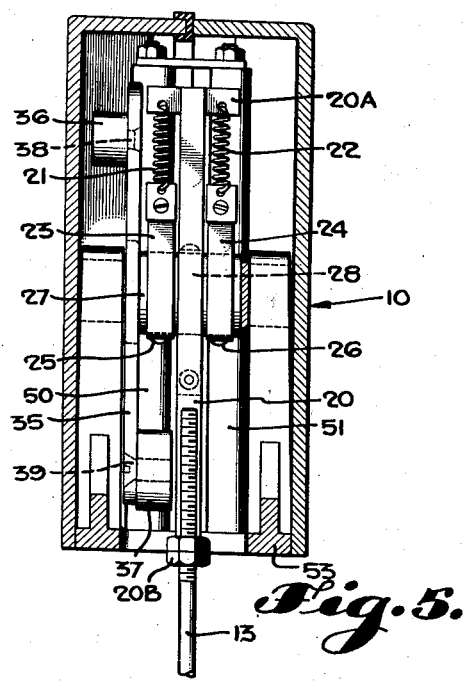
Figure 2:
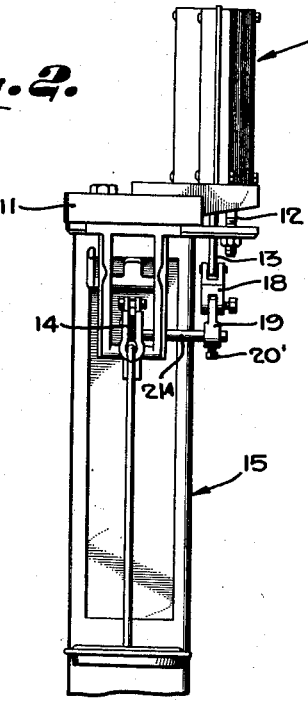
Figure 2 is a view in side elevation of the mounting shown in Figure 1.
Figure 3:
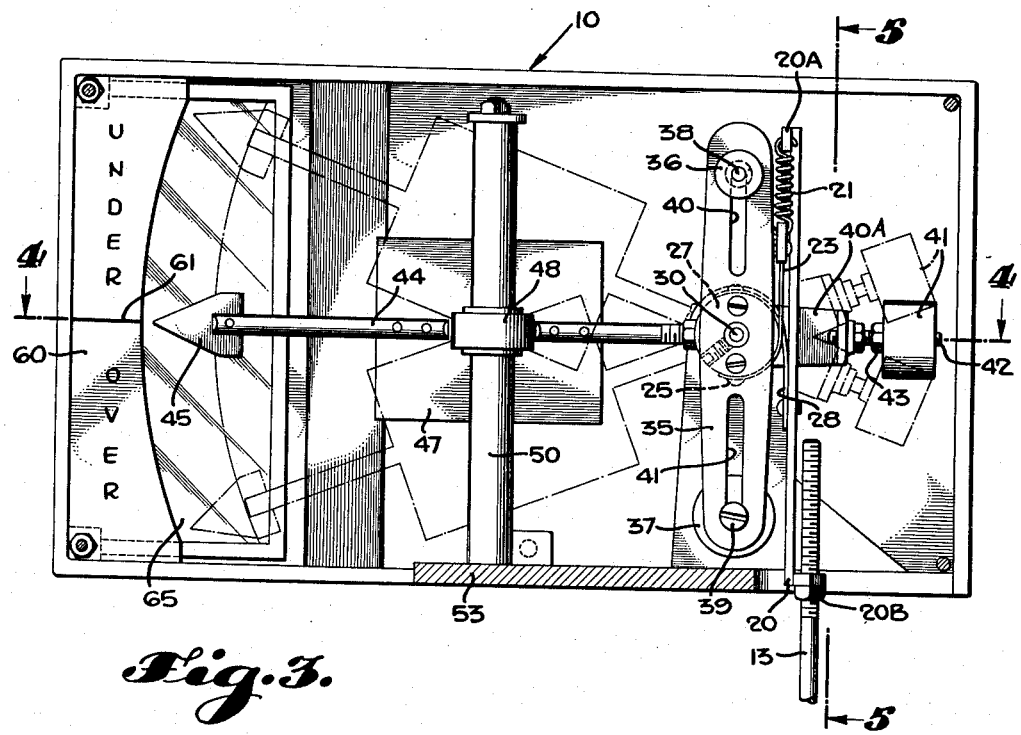
Figure 3 is a view in elevation of the balance indicator shown in Figure 1 with the front cover removed and the pointer moved to its extreme positions to show the range of operation.
Figure 4:
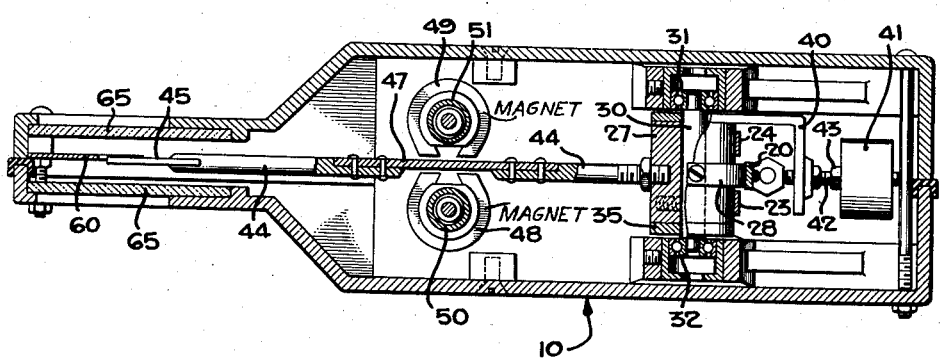

Figures 4 and 5 are sectional views taken respectively substantially on the lines 4—4 and 5—5 of Figure 3.

The balance indicator having the general reference numeral 10 is mounted on the stationary scale arm 11 by the bolt 12 with the movable rod member 13 extending downwardly to move with the conventional beam 14 of the weighing scale 15. This rod 13 may be connected to the beam 14 through a link member 18 which is bifurcated at each end for pivotal pin connection thereto of the rod 13 and the arm 19. The arm 19 is adjustably positioned by means of a set screw 20¹ on the rod 21A attached to and extending from the beam 14. Thus, the motion of the scale beam 14 is transferred to the actuating rod 13 in a weighing operation, the motion of the rod 13 being substantially vertical and provision is made also for its transverse movement, as will be evident from the description herein below.

The rod 13 is threaded at its upper end as shown in Figure 3 and passes through a tapped aperture in the bent end of the actuating rod 20. The threads on rod 13 provide an adjustment for length of the composite rods 13 and 20. After this adjustment is made, the locking nut 20B is tightened.

The actuating rod 20 is connected at its upper end to the cross-arm 20A, to which one end of tension springs 21 and 22 (Figure 5) is attached, the other ends of springs 21 and 22 being connected to flexible tape members 23, 24, which have their other ends anchored by bolts 25, 26 respectively to the rotatable drum 27. The drum 27 is mounted on the shaft 30 (Figure 4), having opposite ends thereof journaled in the antifriction bearings 31, 32 so that the drum 27 is free to rotate. A third tape member 28 is disposed between the tape members 23, 24 and has one of its ends affixed to the drum 27 and the other one of its ends affixed to the rod 20, the springs 21 and 22 being stressed to normally maintain at all times the tapes 21, 22 and 28 in intimate contact with the drum 27. It is noted that when and as the drum 27 is rotated, the tapes 23, 24 on the one hand wind around the drum and on the other hand the tape 28 unwinds, or vice versa, depending upon the direction of rotation of drum 27.

Also affixed to the shaft 30 is the cross-arm 35 having adjustably positioned weights 36, 37 mounted thereon for adjustment of the sensitivity of the balance. These weights 36, 37 are fastened by clamping screws 38, 39 respectively, which pass through the adjustment slots 40 and 41 in the cross-arm 35.

Also affixed to the shaft 30 is the arm 40, bent at its free end to adjustably support a counter-balancing weight 41. The weight 41 is centrally threaded on the bolt 42 which is locked to the arm 40A. To adjust the weight 41 and thus to effect a change in counter-balancing, a locking screw 43 on bolt 42 is released and thereafter weight 41 is moved to adjusted position by turning it, and thereafter the locking nut 43 is again tightened to hold the weight 41 in adjusted position.

The drum 27 has mounted thereon a radially extending arm 44, one end of such arm 44 carrying a dial pointer 45 and an intermediate portion of such arm carrying an eddy current plate 47 which is disposed between and opposite the poles of the permanent magnets 48 and 49, the magnets 48 and 49 being mounted on a U-shaped bracket, the legs of which comprise tubular members 50 and 51 having adjacent ends affixed to the frame 53 of the balance. The magnets 48 and 49 cooperate with the aluminum plate 47 to dampen the motion of the pointer 45. In other words, when and as the pointer 45 and attached plate 47 move, eddy currents are induced in the plate 47 so as to tend to resist the motion of the pointer 45.

The dial pointer 45 cooperates with the adjacently positioned stationary dial 60 having the zero balance mark 61. The upper portion of such dial 60 above the balance mark 61 may have the word "under" thereon, and the portion of the dial 60 below the balance mark 61 may have the word "over" thereon, to thereby designate whether or not the material or substance being weighed on the scale is under or over a predetermined weight.

Also, if desired, the dial 60 may be calibrated directly in terms of pounds. In such case, the scale markings or divisions representing equal increments of weight are uniformly spaced on the dial 60, because of the novel features of the present construction residing in the use of the flexible tape members 23, 24 and 28 arranged to wind around the drum 27. These tape members 23, 24 and 28, in the extreme positions of the pointer 45 represented by the dotted lines in Figure 3, always encircle the drum a fractional turn only, so that the length of the torque arm for rotating the drum 27 is always of constant length, regardless of the position of the pointer 45.

It is further apparent that the motion of the scale beam 14 and attached rods 13, 20 is magnified; this is so since the diameter of the drum 27 is small compared to the length of the arm 44 to which the dial pointer 45 is attached.

The mechanism of the balance shown in Figure 3 is normally enclosed by a weathertight cover having a transparent window 65 therein to allow observation of the position of pointer 45. The housing, frame or casing 53 may, as indicated above, be clamped to the scale arm 11 of the scale 15 by bolts 12, the bolts 12 being anchored to such frame 53.

An important feature of the present balance indicator is the use of magnets to dampen the motion of the pointer, and the use of the flexible tape members 23, 24 to obtain a torque arm of constant length and, further, the manner in which the ends of such tapes 23, 24 are affixed to the cross-arm 20A through coil tension springs 21, 22.

It is noted that when a relatively large weight is initially placed on the scale platform, the attached mechanism is subjected to shock force. In the present construction, such shock forces, applied to the rods 13, 20, cause these rods to move up appreciably and cause the tension springs 21, 22 to elongate, in which case the springs 21, 22 "absorb" some of the shock forces. The amount of such shock forces thus "absorbed" by the springs 21, 22 is augmented due to the presence of the magnets 48 and 49 which tend to resist the movement of the arm 44 and attached drum 27 and tape members 23, 24. Thus the dial pointer 45 is much less inclined to move in response to shock forces than is otherwise the case.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A balance indicator comprising a drum; an indicator arm connected to said drum for pivotal movement about the axis of said drum; an eddy current producing means arranged to retard abrupt changes and movement of said arm; said eddy current producing means comprising a magnet and a relatively movable eddy current plate, said eddy current plate being firmly affixed to said arm for pivotal movement about the axis of said drum; an actuating rod; flexible tape members wound in opposite directions about said drum with one end each of their ends secured thereto, spring means, one of said tape members being connected to said actuating rod and the other one of said flexible tape members being connected to said actuating rod through said spring means.

2. A balance indicator in which an arm is moved to indicate in magnifying form the balanced condition of a weighing scale; a drum member pivoted about its axis and arranged to move said arms; a pair of oppositely wound flexible tape members on said drum member to produce movement of said drum and said arm; an actuating rod, said flexible tape members each having one of its ends attached to said drum member, the other end of one of said flexible tape members being connected to said actuating rod; a tension spring, and the other end of the other one of said flexible tape members being connected through said tension spring to said actuating rod, an indicator arm mounted on said drum member, stationary permanent magnet means, and an eddy current plate firmly affixed to said indicator arm intermediate the ends of said arm and magnetically cooperating with said magnet means to retard abrupt changes and movement of said arm.

3. A balance indicator comprising a rotatable drum member rotatable about a horizontal axis having an indicating arm attached thereto which extends horizontally; a cross-arm extending vertically and having adjustably mounted weights thereon mounted for movement with said drum member, the axis of said cross-arm being substantially perpendicular to the axis of said indicating arm; said cross-arm having a pair of longitudinally extending adjustment slots through which releasable fastening means pass for adjustably positioning said weights on said cross-arm; flexible tape members oppositely wound on said drum member with one end of their ends attached to said drum member; an actuating rod, the other ends of said flexible tapes being each connected to said actuating rod with a tension spring interposed between one of said other ends and said actuating rod eddy current damping means mounted on said indicating arm for damping its movement occasioned by energy stored in said tension spring, a second cross-arm extending generally horizontally and parallel with the axis of said indicating arm, and an adjustably positioned weight mounted on said second cross-arm.

4. In a weighing scale in which an indicator arm is arranged to magnify movements of the beam element of a weighing scale, a drum member rotatable about its axis and arranged to move said indicating arm; a pair of flexible tape members oppositely wound on said drum member with one each of their ends attached to said drum member; an actuating rod, the other ends of said flexible tape members being connected to said actuating rod with a flexible tension spring interposed between one of said other ends of said flexible tape members and said actuating rod to absorb shock loads applied to the weighing scale; and said indicating arm having associated therewith a magnetic brake, whose effectiveness as a brake is most pronounced as the indicator arm tends to move rapidly in response to such shock forces, whereby said magnetic brake imposes a resistance to motion of said indicator arm and increased absorption of said shock forces in said tension spring, said magnetic brake comprising a magnet and a relatively movable eddy current plate, said eddy current plate being firmly affixed to said indicator arm at a point intermediate the ends of said arm for movement about the axis of said drum member.

5. A balance indicator arranged to magnify movements of the beam element of a weighing scale; a drum member rotatably mounted about its axis; an indicating arm extending horizontally and attached to said drum member and movable therewith; a cross-arm extending vertically and having adjustably mounted weights thereon, said cross-arm extending substantially perpendicular to the axis of said indicating arm; means adjustably supporting said weights along the axis of said cross-arm; an actuating rod, the axis of said actuating rod being substantially perpendicular to said indicating arm axis; a pair of oppositely wound flexible tape members wound on said drum member with one of their ends attached to said drum member, the other ends of said flexible tape members being connected to said actuating rod, and eddy current damping means firmly affixed to an intermediate point of said indicator arm for movement about said drum axis.

6. In a weighing scale in which an indicator arm is arranged to magnify movements of the beam element of a weighing scale, a drum member rotatable about its axis and arranged to move said indicator arm; a pair of flexible tape members oppositely wound on said drum member with one each of their ends attached to said drum member; an actuating rod, the other ends of said flexible tape members being connected to said actuating rod with a flexible tension spring interposed between one of said other ends of said flexible tape members and said actuating rod to absorb shock loads applied to the weighing scale; a cross-arm having adjustably mounted weights thereon mounted for movement with said drum member, the axis of said cross-arm being substantially perpendicular to the axis of said indicator arm; adjustment slots in said cross-arm, releasable fastening means passing through said adjustment slots for adjustably maintaining said weights on said cross-arm, said indicator arm having mounted thereon at a point intermediate its ends a magnetic brake whose effectiveness as a brake is more pronounced as the indicator arm tends to move rapidly in response to such shock forces, whereby said magnetic brake imposes a resistance to motion of said indicator arm and increased absorption of said shock forces in said tension spring, said tension spring acting in a direction parallel with the plane in which said indicator arm is movable.

7. In a weighing scale, a drum member rotatable about its axis, an indicator arm attached to said drum, an eddy current plate mounted on said indicator arm at a point intermediate its ends with the plane of said eddy current plate coextensive with the plane in which said arm moves, stationary magnets cooperating with said plate, a cross-arm mounted for movement with said drum member, the axis of said cross-arm being substantially perpendicular to the axis of said indicator arm, adjustable weights, means adjustably supporting said weights along the longitudinal axis of said cross-arm, flexible tape members oppositely wound on said drum member with one each of their ends attached to said drum member, an actuating rod, the other ends of said flexible tapes being each connected to said actuating rod with a tension spring interposed between one of said other ends and said actuating rod, said tension spring extending in a direction substantially parallel to the plane of movement of said indicator arm.

RAYMOND B. HOLT.

References Cited in the file of this patent

UNITED STATES PATENTS

| Number | Name | Date |
| --- | --- | --- |
| 1,563,019 | Craig | Nov. 24, 1925 |
| 1,740,320 | Van Duyn | Dec. 17, 1929 |
| 1,800,017 | Hamblin et al. | Apr. 7, 1931 |
| 1,864,537 | Hapgood | June 28, 1932 |
| 1,937,223 | Gattoni | Nov. 28, 1933 |
| 2,033,318 | Abramson | Mar. 10, 1936 |